(12) United States Patent
Woltmann

(10) Patent No.: US 6,391,399 B1
(45) Date of Patent: May 21, 2002

(54) ARTIFICIAL AQUATIC PLANT SYSTEM

(75) Inventor: Klaus W. Woltmann, Demarest, NJ (US)

(73) Assignee: Imagine Gold, L.L.C., South Hackensack, NJ (US)

( * ) Notice: Subject to any disclaimer, the term of this patent is extended or adjusted under 35 U.S.C. 154(b) by 0 days.

(21) Appl. No.: 09/578,753

(22) Filed: May 25, 2000

(51) Int. Cl.$^7$ .................................................. A41G 1/00
(52) U.S. Cl. .............................. 428/27; 428/17; 428/23; 248/27.8; 248/317
(58) Field of Search ............................ 428/17, 23, 27, 428/15; 248/27.8, 317

(56) References Cited

U.S. PATENT DOCUMENTS

| | | |
|---|---|---|
| 3,164,352 A | 1/1965 | Weaver |
| 3,512,503 A | 5/1970 | Willinger |
| 3,644,164 A | 2/1972 | Chin |
| 3,682,753 A | 8/1972 | Willinger |
| 3,744,454 A | 7/1973 | Willinger et al. |
| 4,185,743 A * | 1/1980 | Willinger |
| 4,340,625 A | 7/1982 | Willinger |
| 4,974,545 A | 12/1990 | Jones |
| 5,320,884 A | 6/1994 | Tai et al. |

* cited by examiner

Primary Examiner—Deborah Jones
Assistant Examiner—Wendy Boss
(74) Attorney, Agent, or Firm—Arthur Jacob

(57) ABSTRACT

An artificial aquatic plant is displayed in a desired array juxtaposed with the inside surface of a wall of an aquarium by attaching one end of the plant to a retainer secured to a frame at the top of the aquarium and extending longitudinally along the wall, and by attaching the other end of the plant to an anchor buried in a bed of sand or gravel at the bottom of the aquarium. The artificial aquatic plant is constructed of synthetic resin materials and at least some components of the plant are fabricated of a synthetic resin material having insufficient buoyancy to support the plant in the desired array within the water contained in the aquarium. Support of the plant in the displayed array is accomplished by the attachment of the ends of the plant to the retainer and to the anchor.

32 Claims, 3 Drawing Sheets

ARTIFICIAL AQUATIC PLANT SYSTEM

The present invention relates generally to the decoration of aquariums and pertains, more specifically, to a system for decorating aquariums with artificial aquatic plants.

Aquariums have been popular for a very long time as decorative installations in home, business and commercial settings, and have found a large following among hobbyists. Various decorative items have been made available for enhancing the aesthetic appearance of aquariums, including a very wide variety of artificial aquatic plants adapted to be placed within the aquariums themselves. These artificial aquatic plants usually are constructed of synthetic polymeric materials, such as polyethylene, which can be molded into realistic replications of natural plant parts. The artificial aquatic plants usually are immersed within the water in the aquarium and are anchored at the bottom of an aquarium with the molded plant parts supported by buoyancy or with relatively stiff wire reinforcing elements incorporated into the plant parts.

Artificial plants having an even more realistic appearance advantageously are constructed of synthetic polymeric materials such as polyester; however, since these materials have little or no buoyancy and are not amenable to the reception of stiffening reinforcement elements, artificial aquatic plants destined for aquariums ordinarily have not been constructed of these materials. Thus, while aesthetically more appealing artificial plants can be created through the use of such materials, these artificial plants heretofore have not been made available for practical and effective use in connection with the decoration of aquariums.

The present invention provides an effective and practical system for decorating aquariums with artificial aquatic plants of enhanced aesthetic appearance, essentially independent of the materials employed in the construction of the artificial plant. As such, the present invention attains several objects and advantages, some of which are summarized as follows: Provides a system for the ready and simplified incorporation of artificial plants of enhanced aesthetic appeal within conventional aquariums; enables effective placement of artificial aquatic plants of enhanced aesthetic appearance within a wide variety of aquariums, independent of the materials used in the construction of such artificial plants; allows enhanced aesthetic arrangements of artificial aquatic plants immersed within aquariums without reliance upon buoyancy or the incorporation of stiffening elements within the artificial plant structure; provides increased versatility in decorating aquariums with artificial aquatic plants; attains a wider variety of desirable aesthetic effects in the placement of artificial plants in aquariums; enables increased ease in decorating aquariums with artificial aquatic plants without a concomitant increase in cost and expense; provides a reliable system for decorating aquariums with artificial aquatic plants for exemplary performance over a long service life.

The above objects and advantages, as well as further objects and advantages, are attained by the present invention, which may be. described briefly as an artificial aquatic plant system for displaying a simulated plant in juxtaposition with a surface of an altitudinal wall of an aquarium, the altitudinal wall having an altitudinally upper edge and an altitudinally lower basal portion, the aquarium having a bottom adjacent the basal portion, the artificial aquatic plant system comprising: an artificial aquatic plant having a length extending between opposite ends; a retainer for placement adjacent the upper edge of the altitudinal wall of the aquarium, the retainer having a mounting element for mounting the retainer adjacent the upper edge of the altitudinal wall and a first coupling element integral with the mounting element for coupling one of the opposite ends of the artificial aquatic plant to the mounting element; and an anchor for placement adjacent the basal portion of the altitudinal wall, the anchor having a second coupling element for coupling the other of the opposite ends of the artificial aquatic plant to the anchor such that upon placement of the retainer adjacent the upper edge, placement of the anchor adjacent the basal portion, and coupling of the opposite ends of the artificial aquatic plant at the respective first and second coupling elements, the length of the artificial aquatic plant is extended in juxtaposition with the altitudinal wall between the retainer and the anchor, and the artificial aquatic plant is displayed in an array juxtaposed with the surface of the altitudinal wall of the aquarium.

Further, the invention includes a retaining system for retaining an. artificial aquatic plant displayed in juxtaposition with a surface of an altitudinal wall of an aquarium, the altitudinal wall having an upper edge and a lower basal portion, the aquarium having a bottom adjacent the basal portion, and the artificial plant having a length extending between opposite ends, the retaining system comprising: a retainer for placement adjacent the upper edge of the altitudinal wall of the aquarium, the retainer having a mounting element for mounting the retainer adjacent the upper edge of the altitudinal wall and a first coupling element integral with the mounting element for coupling one of the opposite ends of the artificial aquatic plant to the mounting element; and an anchor for placement adjacent the basal portion of the altitudinal wall, the anchor having a second coupling element for coupling the other of the opposite ends of the artificial aquatic plant to the anchor such that upon placement of the retainer adjacent the upper edge, placement of the anchor adjacent the basal portion, and coupling of the opposite ends of the artificial aquatic plant at the respective first and second coupling elements, the length of the artificial aquatic plant is extended along the altitudinal wall between the retainer and the anchor, and the artificial aquatic plant is displayed in juxtaposition with the surface of the altitudinal wall of the aquarium.

In addition, the invention includes an artificial aquatic plant for display in an array juxtaposed with a surface of an altitudinal wall of an aquarium, the altitudinal wall having an altitudinally upper edge and an altitudinally lower basal portion, the aquarium having a bottom adjacent the basal portion, the artificial aquatic plant comprising: a simulated plant structure having a length extending between opposite ends; and a retention member at each of the opposite ends for retaining one of the opposite ends adjacent the upper edge and the other of the opposite ends adjacent the basal portion of the altitudinal wall to display the artificial aquatic plant in the array juxtaposed with the surface of the altitudinal wall.

The invention will be understood more fully, while still further objects and advantages will become apparent, in the following detailed description of a preferred embodiment of the invention illustrated in the accompanying drawing, in which.

Figure 1:
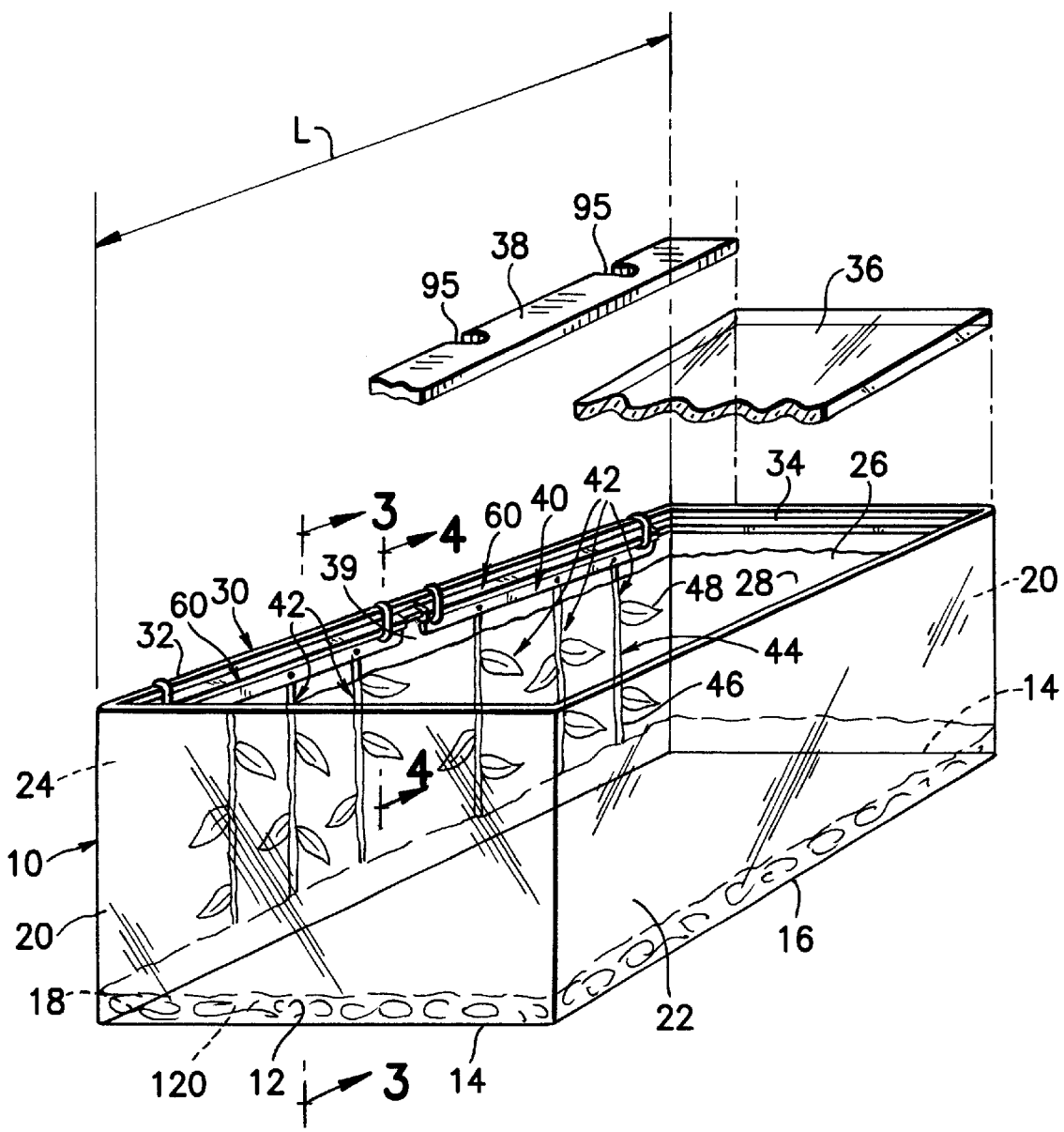
FIG. 1 is a pictorial perspective view of an aquarium decorated with an artificial aquatic plant system constructed in accordance with the present invention.

Referring now to the drawing, and especially to FIG. 1 thereof, a conventional, quite common aquarium is shown at 10 and is seen to include a rectangular bottom 12 having longitudinally opposite side edges 14, a front edge 16, and a rear edge 18 laterally opposite the front edge 16. Rectangular side walls 20 extend altitudinally upwardly. from the bottom 12 at each of the side edges 14, a rectangular front wall 22 extends altitudinally upwardly from the bottom 12 at the front edge 16, and a rectangular rear wall 24 extends altitudinally upwardly from the bottom 12 at the rear edge 18. The side walls 20 and front wall 22 are constructed of a transparent material, such as glass or a synthetic polymeric material, for enabling viewing of the interior 26 of the aquarium 10, and all of the walls 20, 22 and 24 are joined to the bottom 12, while adjacent walls are joined to one another, to form a requisite watertight structure for containing water 28 within the interior 26 of the aquarium 10.

As is conventional in aquariums, a frame 30 extends along upper perimeter 32 of the aquarium 10 and includes a shelf 34 which projects laterally over the interior 26 for supporting a selectively removable top cover 36 and a supplemental top plate 38 such that when in place upon the shelf 34, the cover 36 and the plate 38 together essentially close top opening 39 of the aquarium 10. The top plate 38 enables access to the interior 26 of the aquarium 10 adjacent the rear wall 24 without requiring removal of the top cover 36 so that various aquarium accessories can be located in the aquarium 10, adjacent the rear wall 24, as is now conventional in the construction of aquariums.

In accordance with the present invention, an artificial aquatic plant system 40 is utilized to place artificial aquatic plants 42 within the aquarium 10, arrayed adjacent the rear wall 24, as described in detail below, to decorate the aquarium 10. Artificial aquatic plants 42 may be constructed to emulate actual aquatic plants, or may be constructed in the form of fanciful plants which do not occur in nature. In either case, artificial aquatic plants 42 are provided with component parts which simulate the structure of live plants and are shown in the present embodiment to include an assembly 44 of component parts in the form of stem components 46 and leaf components 48. In order to attain exceptional realism and a highly desirable aesthetic appearance, the leaf components 48 preferably are constructed of a polyester resin which has been found to provide the desired characteristics for such an appearance. However, polyester resins having these desired characteristics do not have sufficient buoyancy to support assembly 44 when immersed in water 28 within the interior 26 of aquarium 10 and require support in order to display artificial aquatic plant 42 in an appropriate array within aquarium 10. While the stem components 46 can be constructed of a relatively buoyant synthetic polymeric material, such as polyethylene, and adapted to carry the leaf components 48 fabricated of another material, as by connections at 49 (see FIG. 3), the buoyancy provided by the relatively slender stem components 46 is insufficient to support the completed assembly 44 of leaf components 48 and stem components 46 in the desired array.

Figure 2:
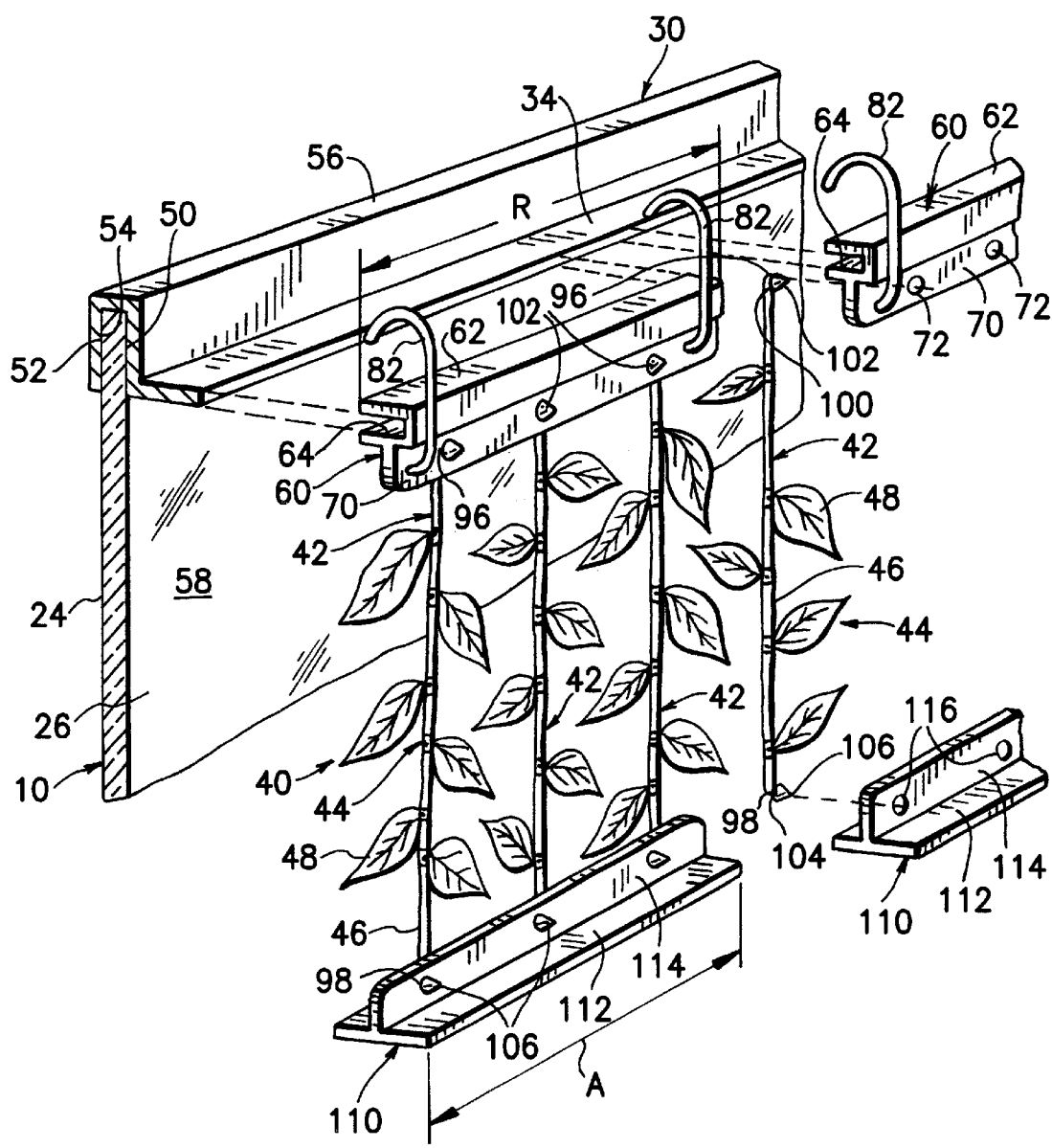
FIG. 2 is an enlarged, exploded fragmentary perspective view showing structural features of the artificial aquatic plant system.
Figures 3, 4:
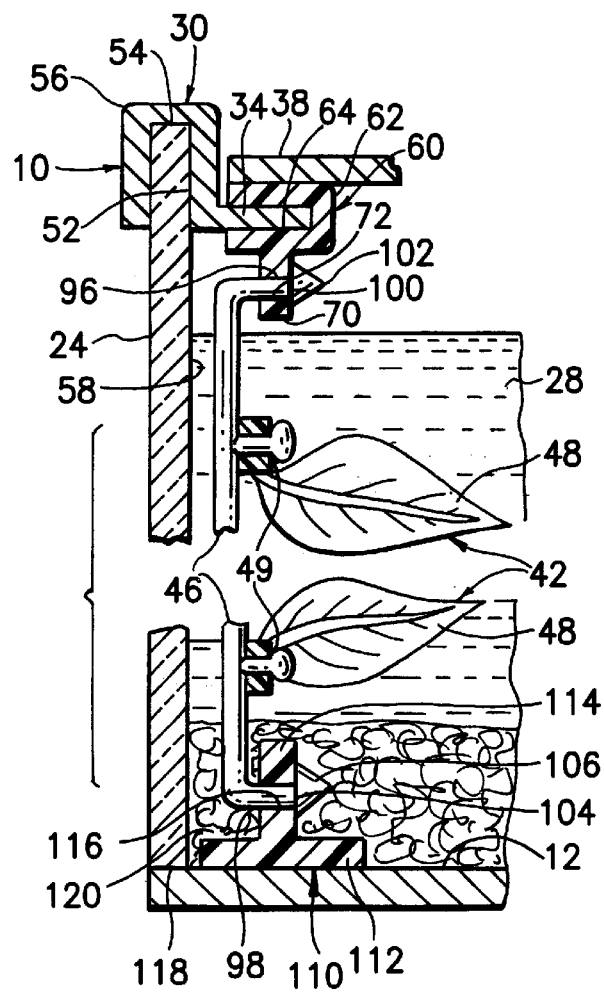
FIG. 3 is an enlarged cross-sectional view taken along line 3—3 of FIG. 1.
FIG. 4 is an enlarged fragmentary cross-sectional view taken along line 4—4 of FIG. 1.

Turning now to FIGS. 2 through 4, as well as to FIG. 1, frame 30 is fitted to uppermost rim 50 of aquarium 10 by means of a slot 52 which receives an upper peripheral edge of each wall of the aquarium 10, as illustrated by peripheral edge 54 of rear wall 24 received within slot 52 of a rear leg 56 of the frame 30, with the shelf 34 projecting laterally inwardly from the inside surface 58 of the rear wall 24 toward the interior 26 of the aquarium 10. Artificial aquatic plant system 40 includes a retainer 60 having a mounting element illustrated in the form of a clip-type member 62 having a channel 64 essentially complementary to the shelf 34 of the frame 30 and extending longitudinally along the clip-type member 62 such that the clip-type member 62 is selectively fitted over the shelf 34, as seen in FIG. 3. A coupling element in the form of a bar 70 depends downwardly from the clip-type member 62 and carries a plurality of first apertures 72 spaced longitudinally from one another along the bar 70. Upon fitting the clip-type member 62 over the shelf 34, bar 70 is suspended from the frame 30, adjacent the rear wall 24.

As best seen in FIG. 4, a supplemental securing device 80 secures the clip-type member 62 in place on the frame 30 and is seen to include a wire member 82 affixed at one end 84 to the bar 70 and having a grasping portion 86 adjacent the other end 88 for grasping the frame 30 along outer surface 90 of the frame 30. In the preferred construction, wire member 82 has a core 92 of bendable wire coated with a protective sheath 94 of synthetic resin material. Thus, wire member 82 is bent over frame 30 to secure the retainer 60 in place upon the frame 30. Supplemental top plate 38 is provided with slots 95 to allow the top plate 38 to seat properly on shelf 34 while wire member 82 extends over frame 30.

Each artificial aquatic plant 42 has a length extending between opposite ends 96 and 98. Each stem component 46 has a length extending between the opposite ends 96 and 98 of each artificial aquatic plant 42 and includes an upper end 100 having a retention member in the form of a barb 102 such that upon threading the stem component 46 through a corresponding first aperture 72 in the bar 70, the upper end 100 of the stem component 46 is attached to the bar 70. The barb 102 preferably projects forwardly so as to place the stem component 46 behind the bar 70, when connected to bar 70, thereby juxtaposing the artificial aquatic plant 42 closely adjacent the inside surface 58 of the rear wall 24. In a similar manner, an opposite lower end 104 of the stem component 46 is provided with a retention member in the form of a barb 106 and is attached to an anchor 110 having a longitudinally extending basal member 112 and a coupling element in the form of a second bar 114 projecting upwardly from the basal member 112 and carrying a plurality of second apertures 116 spaced longitudinally from one another along the bar 114. Upon threading the stem component 46 through a corresponding second aperture 116 in the second bar 114, the lower end 104 of the stem component 46 is attached to the anchor 110. The basal member 112 is placed adjacent the bottom 12 of the aquarium 10 and is located adjacent a lower basal portion 118 of the rear wall 24, buried in a bed 120 of sand or gravel usually placed at the bottom of an aquarium such that the artificial aquatic plant 42 spans the distance between the retainer 60 and the anchor 110 so as to be draped over the rear wall 24 of the aquarium 10 and displayed in a desired array along the inside surface 58 of the rear wall 24 independent of the nature of the material of the assembly 44. The barbs 102 and 106 assure that each stem component 46 is tensioned sufficiently to provide an aesthetically pleasing display, without disconnection from the retainer 60 or the anchor 110. In addition, the draped array provided by the plurality of artificial aquatic plants 42 serves to mask the presence of various unsightly aquarium accessories, such as filter tubes, heaters and related wires, usually placed along the rear wall of an aquarium, thereby further enhancing the aesthetic appearance of aquarium 10.

Aquariums are furnished in a variety of different sizes and configurations, each usually having a rear wall with a given standard longitudinal length, illustrated by the length L of rear wall 24. In order to accommodate different standard lengths L encountered in different aquariums, the retainer 60 and the anchor 110 each are supplied with longitudinal lengths R and A, respectively, approximately equal to any standard longitudinal length L divided by a whole number which enables the selection of an appropriate number of retainers 60 and anchors 110 to span essentially the entire length L and provide a display which extends essentially over the full length of the rear wall 24. The lengths R and A are made short enough so that even a non-standard length L can be accommodated with enough retainers 60 and anchors 110 to attain adequate coverage of a rear wall of non-standard length for an aesthetically pleasing display. For example, aquariums having standard lengths of twelve, eighteen, twenty-four and thirty-six inches all are accommodated by retainers and anchors each having a length of approximately six inches, by using two, three, four and six sets of retainers and anchors, respectively. A non-standard length of twenty inches is accommodated by three sets of retainers and anchors spaced along the length to provide an adequate display. Aquariums having different standard heights are accommodated by providing artificial aquatic plants 42 of different lengths.

It will be seen that the present invention attains all of the objects and advantages summarized above, namely: Provides a system for the ready and simplified incorporation of artificial plants of enhanced aesthetic appeal within conventional aquariums; enables effective placement of artificial aquatic plants of enhanced aesthetic appearance within a wide variety of aquariums, independent of the materials used in the construction of such artificial plants; allows enhanced aesthetic arrangements of artificial aquatic plants immersed within aquariums without reliance upon buoyancy or the incorporation of stiffening elements within the artificial plant structure; provides increased versatility in decorating aquariums with artificial aquatic plants; attains a wider variety of desirable aesthetic effects in the placement of artificial plants in aquariums; enables increased ease in decorating aquariums with artificial aquatic plants without a concomitant increase in cost and expense; provides a reliable system for decorating aquariums with artificial aquatic plants for exemplary performance over a long service life.

It is to be understood that the above detailed description of a preferred embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. An artificial aquatic plant system for displaying a simulated plant in juxtaposition with a surface of an altitudinal wall of an aquarium, the altitudinal wall having an altitudinally upper edge and an altitudinally lower basal portion, the aquarium having a bottom adjacent the basal portion, the artificial aquatic plant system comprising:
   an artificial aquatic plant having a length extending between opposite ends;
   a retainer for placement adjacent the upper edge of the altitudinal wall of the aquarium, the retainer having a mounting element for mounting the retainer adjacent the upper edge of the altitudinal wall and a first coupling element integral with the mounting element for coupling one of the opposite ends of the artificial aquatic plant to the mounting element; and
   an anchor for placement adjacent the basal portion of the altitudinal wall, the anchor having a second coupling element for coupling the other of the opposite ends of the artificial aquatic plant to the anchor such that upon placement of the retainer adjacent the upper edge, placement of the anchor adjacent the basal portion, and coupling of the opposite ends of the artificial aquatic plant at the respective first and second coupling elements, the length of the artificial aquatic plant is extended in juxtaposition with the altitudinal wall between the retainer and the anchor, and the artificial aquatic plant is displayed in an array juxtaposed with the surface of the altitudinal wall of the aquarium.

2. The invention of claim 1 wherein the surface of the altitudinal wall is an inside surface, and at least a portion of the artificial aquatic plant is constructed of a synthetic resin material having insufficient buoyancy to support the artificial aquatic plant in the array in juxtaposition with the altitudinal wall, the artificial aquatic plant being supported in the array by retention of the ends of the artificial aquatic plant at the retainer and at the anchor.

3. The invention of claim 1 wherein the upper edge of the altitudinal wall extends longitudinally along the wall, the mounting element includes a clip-type member having a longitudinal length and a channel extending along the longitudinal length for holding the mounting element adjacent the upper edge of the wall, and the first coupling element includes a first bar integral with the clip-type member and extending longitudinally along the clip-type member, and at least one first aperture in the first bar for secured reception of the one end of the artificial aquatic plant.

4. The invention of claim 3 wherein the artificial aquatic plant includes a stem component, the opposite ends are located. on the stem component, and the length extends along the stem component, the stem component being adapted to carry further simulated plant components along the length thereof between the opposite ends for establishing the simulated plant and displaying the artificial aquatic plant in juxtaposition with the surface of the altitudinal wall of the aquarium.

5. The invention of claim 3 wherein the surface of the altitudinal wall of the aquarium is an inside surface, the aquarium includes a top opening and a frame extending along the upper edge of the altitudinal wall, the frame having a shelf extending laterally to be located over the top opening for supporting an aquarium cover, the channel of the clip-type member is generally complementary to the shelf for receiving the shelf within the clip-type member to mount the mounting element upon the frame, and the first bar depends from the clip-type member to juxtapose the first bar with the inside surface of the altitudinal wall upon placement of the mounting element upon the frame.

6. The invention of claim 5 including a plurality of first apertures spaced apart longitudinally from one another along the first bar.

7. The invention of claim 5 wherein the anchor includes a basal member having a longitudinal length for resting adjacent the bottom of the aquarium, and the second coupling element includes a second bar integral with the basal member and extending longitudinally along the basal member, and at least one second aperture in the second bar for secured reception of other end of the artificial aquatic plant.

8. The invention of claim 7 wherein the second bar projects upwardly from the basal member of the anchor upon placement of the anchor adjacent the bottom of the aquarium.

9. The invention of claim 8 including a plurality of first apertures spaced apart longitudinally from one another along the first bar, and a plurality of second apertures spaced apart longitudinally from one another along the second bar.

10. The invention of claim 7 wherein the artificial aquatic plant includes a stem component, the opposite ends are located on the stem component and the length extends along the stem component, the stem component being adapted to carry further simulated plant components along the length thereof between the opposite ends for establishing the simulated plant and displaying the artificial aquatic plant arrayed in juxtaposition with the surface of the altitudinal wall of the aquarium, the stem component includes a retention member at each of the opposite ends for retaining the one end of the stem component in the first aperture and the other end of the stem component in the second aperture.

11. The invention of claim 10 wherein each retention member comprises a barb integral with the stem component at a corresponding end of the stem component.

12. The invention of claim 10 wherein at least some of the further simulated plant components are constructed of a synthetic resin material having insufficient buoyancy to support the artificial aquatic plant in the array in juxtaposition with the altitudinal wall, the artificial aquatic plant being supported in the array by retention of the ends of the stem component at the retainer and at the anchor.

13. The invention of claim 5 including a supplemental securing device extending from the retainer for securing the retainer to the frame.

14. The invention of claim 13 wherein the frame includes an inner side juxtaposed with the top opening of the aquarium and an opposite outer side, the shelf extends from the inner side and the supplemental securing device is engaged with the first bar and includes a grasping section for grasping the frame at the outer side.

15. The invention of claim 1 wherein the altitudinal wall has a given longitudinal wall length selected from a plurality of available longitudinal wall lengths, and the retainer has a. longitudinal length approximately equal to the longitudinal length of any one of the available longitudinal lengths divided by a whole number which enables retainers to be placed along essentially the entire extent of any one of the plurality of longitudinal wall lengths.

16. The invention of claim 15 wherein the anchor has a longitudinal length approximately equal to the longitudinal length of any one of the available longitudinal lengths divided by a whole number which enables anchors to be placed along essentially the entire extent of any one of the plurality of longitudinal wall lengths.

17. A retaining system for retaining an artificial aquatic plant displayed in juxtaposition with a surface of an altitudinal wall of an aquarium, the altitudinal wall having an upper edge and a lower basal portion, the aquarium having a bottom adjacent the basal portion, and the artificial plant having a length extending between opposite ends, the retaining system comprising:

a retainer for placement adjacent the upper edge of the altitudinal wall of the aquarium, the retainer having a mounting element for mounting the retainer adjacent the upper edge of the altitudinal wall and a first coupling element integral with the mounting element for coupling one of the opposite ends of the artificial aquatic plant to the mounting element; and an anchor for placement adjacent the basal portion of the altitudinal wall, the anchor having a second coupling element for coupling the other of the opposite ends of the artificial aquatic plant to the anchor such that upon placement of the retainer adjacent the upper edge, placement of the anchor adjacent the basal portion, and coupling of the opposite ends of the artificial aquatic plant at the respective first and second coupling elements, the length of the artificial aquatic plant is extended along the altitudinal wall between the retainer and the anchor, and the artificial aquatic plant is displayed in juxtaposition with the surface of the altitudinal wall of the aquarium.

18. The invention of claim 17 wherein the upper edge of the altitudinal wall extends longitudinally along the wall, the mounting element includes a clip-type member having a longitudinal length and a channel extending along the longitudinal length for holding the mounting element adjacent the upper edge of the wall, and the first coupling element includes a first bar integral with the clip-type member and extending longitudinally along the clip-type member, and at least one first aperture in the first bar for secured reception of the one end of the artificial aquatic plant.

19. The invention of claim 18 wherein the anchor includes a basal member having a longitudinal length for resting adjacent the bottom of the aquarium, and the second coupling element includes a second bar integral with the basal member and extending longitudinally along the basal member, and at least one second aperture in the second bar for secured reception of the other end of the artificial aquatic plant.

20. The invention of claim 18 wherein the surface of the altitudinal wall of the aquarium is an inside surface, the aquarium includes a top opening and a frame extending along the upper edge of the altitudinal wall, the frame having a shelf extending laterally to be located over the top opening for supporting an aquarium cover, the channel of the clip-type member is generally complementary to the shelf for receiving the shelf within the clip-type member to mount the mounting element upon the frame, and the first bar depends from the clip-type member to juxtapose the first bar with the inside surface of the altitudinal wall upon placement of the mounting element upon the frame.

21. The invention of claim 20 including a plurality of first apertures spaced apart longitudinally from one another along the first bar.

22. The invention of claim 20 wherein the anchor includes a basal member having a longitudinal length for resting adjacent the bottom of the aquarium, and the second coupling element includes a second bar integral with the basal member and extending longitudinally along the basal member, and at least one second aperture in the second bar for secured reception of other end of the artificial aquatic plant.

23. The invention of claim 22 wherein the second bar projects upwardly from the basal member of the anchor upon placement of the anchor adjacent the bottom of the aquarium.

24. The invention of claim 23 including a plurality of first apertures spaced apart longitudinally from one another along the first bar, and a plurality of second apertures spaced apart longitudinally from one another along the second bar.

25. The invention of claim 20 including a supplemental securing device extending from the retainer for securing the retainer to the frame.

26. The invention of claim 25 wherein the frame includes an inner side juxtaposed with the top opening of the aquarium and an opposite outer side, the shelf extends from the inner side and the supplemental securing device is engaged with the first bar and includes a grasping section for grasping the frame at the outer side.

27. The invention of claim 17 wherein the altitudinal wall has a given longitudinal wall length selected from a plurality of available longitudinal wall lengths, and the retainer has a longitudinal length approximately equal to the longitudinal length of any one of the available longitudinal lengths divided by a whole number which enables retainers to be placed along essentially the entire extent of any one of the plurality of longitudinal wall lengths.

28. The invention of claim 27 wherein the anchor has a longitudinal length approximately equal to the longitudinal length of any one of the available longitudinal lengths divided by a whole number which enables anchors to be placed along essentially the entire extent of any one of the plurality of longitudinal wall lengths.

29. An artificial aquatic plant for display in an array juxtaposed with a surface of an altitudinal wall of an aquarium, the altitudinal wall having an altitudinally upper edge and an altitudinally lower basal portion, the aquarium having a bottom adjacent the basal portion, the artificial aquatic plant comprising:

a simulated plant structure having a length extending between opposite ends; and a retention member at each of the opposite ends for retaining one of the opposite ends adjacent the upper edge and the other of the opposite ends adjacent the basal portion of the altitudinal wall to display the artificial aquatic plant in the array juxtaposed with the surface of the altitudinal wall.

30. The invention of claim 29 wherein the artificial aquatic plant includes component parts simulating plant parts, at least some of the component parts being constructed of a synthetic resin material having insufficient buoyancy to support the artificial aquatic plant in the array in juxtaposition with the altitudinal wall.

31. The invention of claim 30 wherein the component parts include a stem component extending along the length of the artificial aquatic plant, the opposite ends and the retention members being located on the stem component.

32. The invention of claim 31 wherein each retention member comprises a barb integral with the stem component at a corresponding end of the stem component.

* * * * *